United States Patent [19]

Antonsen et al.

[11] 3,952,087

[45] Apr. 20, 1976

[54] PRODUCTION OF HIGH STRUCTURE CARBON BLACKS

[75] Inventors: Randolph Antonsen, Boston; Allan Clark Morgan, Sudbury, both of Mass.; Roger T. Ball, Pampa, Tex.; Ronald C. Hurst, Pampa, Tex.; Dennis J. Potter, Pampa, Tex.; Robert I. Wood, Cuddington, England

[73] Assignee: Cabot Corporation, Boston, Mass.

[22] Filed: Sept. 13, 1974

[21] Appl. No.: 505,616

[52] U.S. Cl. ............................. 423/450; 423/445; 423/455; 423/457
[51] Int. Cl.$^2$ ............................................. C09C 1/50
[58] Field of Search ........... 423/450, 455, 456, 457; 23/259.5

[56] References Cited
UNITED STATES PATENTS

| | | | |
|---|---|---|---|
| 2,659,663 | 11/1953 | Heller | 423/457 |
| 2,768,067 | 10/1956 | Heller | 423/456 |
| 2,851,337 | 9/1958 | Heller | 423/455 |
| 3,595,618 | 7/1971 | Kiyonaga et al. | 423/455 |
| 3,619,140 | 11/1971 | Morgan et al. | 423/455 |

*Primary Examiner*—Edward J. Meros
*Attorney, Agent, or Firm*—Jack Schuman; Barry R. Blaker; Lawrence A. Chaletsky

[57] ABSTRACT

This disclosure relates to an improved furnace process for preparing carbon blacks by the incomplete combustion of hydrocarbonaceous feedstocks wherein the resultant blacks have higher structure characteristics than the carbon blacks normally prepared from the feedstocks.

7 Claims, No Drawings

PRODUCTION OF HIGH STRUCTURE CARBON BLACKS

This invention relates to the production of furnace blacks having many important applications such as fillers, pigments and reinforcing agents in rubbers and plastics. Generally, the furnace process for preparing these blacks entails the cracking and/or incomplete combustion of a hydrocarbon feedstock such as natural gas or cycle stock in an enclosed conversion zone at temperatures above 1800°F to produce carbon black. The carbon black entrained in the gases emanating from the conversion zone is then cooled and collected by any suitable means conventionally used in the art. It has, however, been extremely difficult and normally not commercially feasible to produce furnace blacks having higher structure characteristics than that normally resulting from the use of any particular feedstock.

Accordingly, it is a primary object of this invention to provide a novel and improved process for preparing carbon blacks which exhibit higher-than-normal structure characteristics.

A further object of this invention is to provide an improved process for preparing higher-than-normal structure blacks characterized by having good reinforcing properties.

Other and different objects, advantages and features of the present invention will become apparent to those skilled in the art upon consideration of the following detailed description and claims.

In accordance with this invention, it has been found that the above and still further objects are achieved by adding auxiliary liquid or gaseous hydrocarbon to a specific carbon forming process as described in detail hereinafter. The auxiliary liquid or gaseous hydrocarbon is introduced into the carbon black forming process of this invention in any suitable manner at a location in the process defined herein as the zone of substantial reaction. By this term, "zone of substantial reaction," there is meant that zone in the carbon forming process wherein the hydrocarbon make, previously introduced, mixed, atomized and vaporized, is at the moment undergoing the major carbon forming reactions to form the carbon particles. More particularly, the zone of substantial reaction as referred to herein in the present process refers to a point downstream of the location of injection of the hydrocarbon make that is from about 2 to about 60% of the distance from the point of injection of hydrocarbon make to the point of introduction of the quenching medium. In practicing the present invention, the auxiliary hydrocarbon may be injected into the process stream in any convenient manner such as, for example, in a direction axial or transverse to the direction of flow of the gaseous stream. Furthermore, it is not critical at what point in the process the auxiliary hydrocarbon is introduced so long as the auxiliary hydrocarbon enters the zone of substantial reaction in an essentially unreacted form by which is meant in a form not yet reacted so as to produce carbon black particles. In a preferred embodiment, auxiliary liquid or gaseous hydrocarbon is introduced to the carbon forming process at a point downstream of the location where the hydrocarbon make feedstock is injected into the high velocity stream of combustion gases. As will become apparent hereinafter, it is significant whether the auxiliary hydrocarbon is introduced in the form of liquid or gas and also the amounts of auxiliary hydrocarbon utilized influence the properties of the resultant products.

The term "structure" as used herein relative to carbon blacks defines a primary property of carbon black which is not influenced consistently by any property or combination of properties. In general, the term is used in the art to designate the extent of agglomeration of the primary particles of a black. Since all blacks manifest some degree of aggregation of the primary particles, a particular black is classified as being a low, normal or high structure black depending upon the relative degree of aggregation manifested thereby. Delineation between the classifications of low, normal or high structure are generally not well defined. Conventionally, the structure of the black is considered to be high when there is a strong tendency for the particles to form chains of particles. On the other hand, the structure of the black is considered to be low when there is a slight tendency to form agglomerates of primary particles. For purposes of determining the structure of blacks there is used herein an oil absorption technique employing dibutyl phthalate. This technique, which is carried out in accordance with ASTM D-2414-72, is more completely described hereinafter.

At present, the art has recognized a well established relationship involving the structure characteristics of a black and the resulting properties of rubber compositions compounded with the particular blacks. In essence, the relationship has been described by some as being beneficial in the sense that as the amount of structure of a black increases the extruded rubber compositions containing such blacks are smoother and are characterized by low extrusion shrinkage values. Others have described the relationship as one involving the degree of structure of a black and the modulus property of a rubber composition compounded with the particular black. In this case, it is generally accepted that, everything else being essentially equivalent, the use of high structure blacks results in the preparation of rubber compositions having high modulus levels while the use of low structure blacks results in the preparation of compounded rubber compositions having low modulus values. Accordingly, in view of the stated objects of the present invention to provide an improved process for preparing furnace blacks having significantly higher structure levels, it has been observed that the above-mentioned relationships are correct. Indeed, while producing blacks of significantly higher structure levels, it has been shown that the incorporation of such blacks in natural and synthetic rubber compositions yields rubber compounds having increased modulus values and lower extrusion shrinkage values.

While direct measurement of the structure characteristics of carbon blacks is possible, it has been demonstrated that an equally reliable, and more convenient, method for determining the structure of blacks entails measurements of the oil absorption properties of the blacks. It is this type of oil absorption technique for determining structure characteristics of blacks which is accepted by the art and is designated as ASTM Test Method D-2414-72 entitled "Dibutyl Phthalate Absorption Number of Carbon Black". In brief, the procedure entails adding dibutyl phthalate (DBP) to a sample of carbon black, in fluffy or pelleted form, in a Brabender-Cabot Absorptometer, made and sold by C. W. Brabender Instruments, Inc., South Hackensack, New Jersey, and measuring the volume of dibutyl phthalate used. The value is expressed in cubic centimeters or milliliters of dibutyl phthalate (DBP) per 100 grams of carbon black.

The process of the present invention may be carried out by injecting a carbon black-yielding feedstock substantially transversely into a pre-formed stream of hot combustion gases flowing in a downstream direction at an average linear velocity of at least 100 feet per second and preferably of at least 500 feet per second. The feedstock is injected transversely into the combustion gases from the periphery of the stream to a degree sufficient to achieve penetration so as to avoid coke formation on the walls of the carbon forming zone of the reactor. The novel feature of the present process resides in the introduction of a specified amount of auxiliary gaseous or liquid hydrocarbon to the modular carbon forming process at the zone of substantial reaction which, as stated earlier, is located at a point downstream of the location of injection of the hydrocarbon make that is from about 2 to about 60% of the distance from the point of injection of hydrocarbon make to the point of introduction of the quench. As a result of this improvement, the carbon blacks produced thereby exhibit significantly higher structure levels, as indicated by increases in dibutyl phthalate absorption numbers of at least 5 milliliters of dibutyl phthalate per 100 grams of carbon black. Furthermore, when the improved blacks are incorporated into rubber compositions, improved rubber physical properties are obtained. The process for carrying out this invention is described in greater detail hereinafter.

In the preparation of the hot combustion gases employed in preparing the high structure blacks of the present invention, there are reacted in a suitable combustion chamber a liquid or gaseous fuel and a suitable oxidant stream such as air, oxygen, mixtures of air and oxygen or the like. Among the fuels suitable for use in reacting with the oxidant stream in the combustion chamber to generate the hot combustion gases are included any of the readily combustible gas, vapor or liquid streams such as hydrogen, carbon monoxide, methane, acetylene, alcohols, kerosene. It is generally preferred, however, to utilize fuels having a high content of carbon-containing components and, in particular, hydrocarbons. For example, streams rich in methane such as natural gas and modified or enriched natural gas are excellent fuels as well as other streams containing high amounts of hydrocarbons such as various hydrocarbon gases and liquids and refinery by-products including ethane, propane, butane, and pentane fractions, fuel oils and the like. Moreover, in the first stage of the preferred modular furnace process air is utilized as the oxidant and natural gas as the fuel in generating the primary combustion fire. As referred to herein, the primary combustion represents the amount of air in the first stage of the modular process relative to the amount of air required for the complete combustion of the first stage hydrocarbon. For purposes of convenience, the primary combustion is expressed in terms of percentage. While the primary combustion may range from 100 to 250%, the preferred percent primary or first stage combustion range varies from about 120 to about 150%.

In this manner there is generated a stream of hot combustion gases flowing at a high linear velocity. It has furthermore been found that a pressure differential between the combustion chamber and the reaction chamber of at least 1.0 p.s.i., and preferably of about 1.5 to 10 p.s.i., is desirable. Under these conditions, there is produced a stream of gaseous combustion products possessing sufficient energy to convert a carbon black-yielding hydrocarbonaceous feedstock to the desired carbon black products. The resultant combustion gases emanating from the combustion stage attain temperatures of at least about 2400°F, with the most preferable temperatures being at least above about 3000°F. The hot combustion gases are propelled in a downstream direction at a high linear velocity which is accelerated by introducing the combustion gases into an enclosed transition stage of smaller diameter which may, if desired, be tapered or restricted such as a conventional venturi throat. It is at this point of the process, which may be considered the second stage, where the feedstock is forcefully injected into the stream of hot combustion gases.

More particularly, in the second stage where the combustion gases are traveling at high velocity and there exists a gas kinetic head of at least above 1.0 p.s.i., a suitable carbon black-yielding hydrocarbon feedstock is injected into the combustion gases, under sufficient pressure to achieve desired penetration, thereby insuring a high rate of mixing and shearing of the hot combustion gases and the hydrocarbon feedstock. As a result of this environment, the hydrocarbon feedstock is rapidly decomposed and converted to carbon black in high yields. Suitable for use herein as hydrocarbon feedstocks which are readily volatilizable under the conditions of the reaction are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like. The feedstock is injected substantially transversely from the periphery of the stream of hot combustion gases in the form of a plurality of small coherent jets which penetrate well into the interior regions of the stream of combustion gases but not to a depth such that opposing jets would impinge. In the practice of this invention, the hydrocarbon feedstock is introduced as jets of liquid by forcing the liquid feedstock through a plurality of orifices having a diameter ranging from 0.01 to 0.15 inch, and preferably ranging from 0.02 to 0.06 inch, under an injection pressure sufficient to achieve the desired penetration. The amount of feedstock utilized will be adjusted in relation to the amounts of fuel and oxidant employed so as to result in an overall percent combustion for the carbon forming process ranging from about 15 to about 60 percent and preferably from about 20 to about 50 percent. The overall combustion represents the total amount of air used in the carbon forming process relative to the amount of air required for the complete combustion of the total amount of hydrocarbon used in the carbon forming process to carbon dioxide and water. The overall combustion is usually expressed as a percentage.

The third stage of the modular process involves the provision of a reaction zone which will permit sufficient residence time for the carbon forming reaction to occur prior to termination of the reaction by quenching. In general, although the residence time in each instance depends upon the particular conditions and the particular black desired, the residence times of the present process vary from as low as 1 millisecond, or less, to above about 100 milliseconds. Accordingly, once the carbon forming reaction has proceeded for the desired period of time, the reaction is terminated by spraying thereon a quench liquid, such as water, using at least one set of spray nozzles. The hot effluent gases containing the carbon black products suspended therein are then passed downstream to the conventional steps of cooling, separation and collection of the carbon black. The separation of the carbon black from the gas stream is readily accomplished by conventional means such as a precipitator, cyclone separator, bag filter, or combinations thereof.

It has now been found that the structure of the blacks prepared by the above-described modular process can be appreciably increased so as to be useful for those applications requiring high structure blacks. In particular, the structure characteristcs of the blacks are increased by introducing a certain amount of gaseous or liquid hydrocarbon, herein referred to as the auxiliary hydrocarbon, in an essentially unreacted form into the carbon forming process at the zone of substantial reaction as hereinbefore defined. Incidentally, it should be noted that the particular hydrocarbon used as the auxiliary hydrocarbon need not be the same as the primary make hydrocarbon feedstock. Generally, the introduction of auxiliary hydrocarbon, whether in gaseous or liquid form, into the present modular process results in blacks of increased structure which impart higher modulus levels to rubber compositions compounded with such blacks.

For purposes of the present invention, the amount of auxiliary hydrocarbon employed herein, whether in gaseous or liquid form, is defined as the percentage of the total carbon (C) input of the reactants employed in carrying out the process. In particular, the amount of auxiliary hydrocarbon used is determined by means of the following equation:

$$\% \text{ C of Auxiliary Hydrocarbon} = \frac{\text{lbs. C in auxiliary hydrocarbon}}{\text{total lbs. C of reactants}} \times 100.$$

In this equation the total carbon input of the reactants represents the sum of the carbon input of the first stage reactants, the carbon input of the make hydrocarbon and the carbon input of the auxiliary hydrocarbon. Generally, the amount of auxiliary hydrocarbon employed ranges from about 2 to about 60% by weight of the total carbon content of the reactants. Preferably, when using a liquid hydrocarbon as an auxiliary hydrocarbon, the amount is such that the carbon content of auxiliary hydrocarbon added will range from an amount of about 5% to about 60%, and preferably from about 10 to about 50%, of the total carbon input of the reactants. On the other hand, when a gaseous hydrocarbon is used as the auxiliary hydrocarbon, then the amount added will vary from about 2 to about 10% by weight of total carbon input of the system, and preferably from about 4 to 8 percent.

The following testing procedures are used in evaluating the analytical and physical properties of the blacks produced by the present invention.

Iodine Adsorption Number — This is determined in accordance with ASTM D-1510–70.

Iodine Surface Area — The surface area of pelletized carbon black products is determined in accordance with the following iodine adsorption technique. In this procedure, a carbon black sample is placed into a porcelain crucible equipped with a loose-fitting cover to permit escape of gases and is devolatilized for a 7-minute period at a temperature of 1700°F in a muffle furnace and then allowed to cool. The top layer of calcined carbon black is discarded to a depth of one fourth inch and a portion of the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear, following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a black sample. Finally, the iodine surface area expressed in square meters per gram is calculated in accordance with the formula [(Percent Iodine Adsorbed × 0.937) −4.5]/Sample Weight = Iodine Surface Area.

This procedure for determining iodine surface area of carbon black pellets is designated as Cabot Test Procedure No. 23.1 for purposes of convenience inasmuch as there is still no official ASTM designation. As shown in a Cabot Corporation publication TG-70-1 entitled, "Industry Reference Black No. 3," by Messrs. Juengel and O'Brien published on Apr. 1, 1970, the iodine surface area of IRB No. 3 (Industry Reference Black No. 3) is 66.5 m²/g as determined in accordance with Cabot Test Procedure 23.1 referred to hereinabove.

Pour Density of Pelleted Carbon Blacks — This is determined in accordance with ASTM D-1513 and reported as lbs/ft³.

Dibutyl Phthalate Absorption Number of Carbon Black — This is determined in accordance with ASTM Test Method D-2414–72, as described earlier herein. The results reported indicate whether or not the black is in fluffy or pelleted form.

Tinting Strength — Tinting strength represents the relative covering power of a pelletized carbon black when incorporated in a 1 to 37.5 weight ratio with a standard zinc oxide (Florence Green Seal No. 8 made and sold by New Jersey Zinc Co.), dispersed in an epoxydized soybean oil type plasticizer (Paraplex G-62 made and sold by Rohm and Haas Co.) and compared to a series of standard reference blacks tested under the same conditions. More particularly, the test involves mulling carbon black, zinc oxide, and plasticizer, in such proportions that the resulting ratio of carbon black to zinc oxide is 1 to 37.5. Reflectance measurements utilizing a Welch Densichron apparatus are then obtained from a film cast on a glass plate and readings are compared to carbon black standards having known tinting strengths. The tinting strengths of the carbon black standards are determined utilizing an arbitrarily assigned value of 100% for the tinting strength of the Cabot standard SRF carbon black. In this instance, as is conventionally done, the standard SRF carbon black arbitrarily assigned a value of 100% for tinting strength is Sterling S or Sterling R semi-reinforcing furnace black made by Cabot Corporation. Each of the Sterling R or Sterling S reference blacks is characterized by having, among other properties, a BET nitrogen surface area of about 23 m²/g, an oil absorption of about 65 to 70 lbs. oil/100 lbs. black, and an average particle diameter of about 800 angstroms as determined by electron microscopy. The only difference is that Sterling R carbon black is in a fluffy form while the Sterling S carbon black is in pelleted form. Accordingly, the black selected for reference purposes then is determined by the state of the blacks to be measured for tinting strengths. The sterling R or Sterling S semi-reinforcing carbon black is thus considered as the primary reference standard for determining tinting strengths of the other blacks.

Furthermore, as described above, additional carbon blacks are utilized as references for establishing tinting strength values covering the range of about 30% to about 250 percent. These are determined relative to the primary standard having the arbitrarily assigned value of 100% for tinting strength. In this manner, a series of blacks having a wide range of tinting strengths is made available so as to provide reference blacks that approximate as closely as possible the black to be measured. Exemplary carbon blacks employed as auxiliary tinting strength standards for purposes of the above procedure include the following blacks made by Cabot Corporation. The analyticals are determined in accordance with the test procedures set forth in the present application.

| Analytical Properties | Sterling MT (Medium Thermal) | Sterling FT (Fine Thermal) | Vulcan 6H | Vulcan 9 |
|---|---|---|---|---|
| Tinting Strength, % | 31 | 56 | 220 | 252 |
| Iodine Surface Area, $m^2/g$ | 5.0 | 8.4 | 110 | 119 |
| DBP Absorption, cc/100 g | 33.6 | 35.9 | 131 | 117 |

For purposes of reference, the tinting strength of IRB No. 3 as determined in accordance with the above procedure is 208% of the primary Sterling S semi-reinforcing black. This is shown in a Cabot Corporation publication, TG-70-1 entitled, "Industry Reference Black No. 3" by Messrs. Juengel and O'Brien published on Apr. 1, 1970.

Modulus and Tensile — These physical properties are determined in accordance with the procedures described in ASTM Test Method D-412. In brief, the modulus measurement relates to the pounds per square inch pull observed when a sample of vulcanized rubber is stretched to 300% of its original length. The tensile measurement is a determination of the number of pounds per square inch pull required to rupture or break a sample of vulcanized rubber in a tension test.

Roadwear Rating — the procedure for measuring and evaluating roadwear or treadwear is well known to the art and is completely described in Cabot Corporation's Technical Service Report No. TG-67-1 on "The Use of Multi-Section Treads in Tire Testing" by Fred E. Jones (1967). It is to be noted that, as in the case of any procedure for measuring wear ratings, the evaluations are made relative to a standard reference black which is arbitrarily assigned a wear rating value of 100 percent. In this instance, the black selected as the reference standard for evaluating roadwear is an ISAF (intermediate super abrasion furnace) type black, having an ASTM designation of N-220, made by Cabot Corporation and further characterized by having a tinting strength of 232%, an iodine surface area of 97.9 $m^2/g$, a DBP absorption of 114.9 cc/100 g, and a density of 22.2 lbs./cu. ft. For ease of reference, this treadwear reference black is described as Cabot's ISAF type reference black no. D-6607. The above method for determining relative wear ratings of treadstocks is preferred to the use of laboratory tests for measuring abrasion since it is known to be difficult to extrapolate such results to actual performance. Accordingly, the road-wear results shown herein reflect accurately the performance of treadstocks relative to Cabot's standard ISAF type black no. D-6607 having an arbitrarily assigned value of 100 percent.

In carrying out the above roadwear evaluations there is used the following formulation of ingredients, expressed in parts by weight, which are admixed by means of a Banbury mill.

| Ingredient | Parts by Weight |
|---|---|
| Styrene-butadiene | 89.38 |
| Cis-4-polybutadiene | 35 |
| Carbon black | 75 |
| Sundex 790 | 25.62 |
| Zinc oxide | 3 |
| Sunproof Improved | 2.5 |
| Wingstay 100 | 2 |
| Stearic acid | 2 |
| Santocure (CBS) | 1.4 |
| Sulfur | 1.75 |

With regard to the foregoing formulation for use in road tests, designated hereinafter as RTF-1, Santocure (CBS) is the trade designation for N-cyclohexyl-2-benzothiazole-sulfenamide, a curing agent for rubber systems; Sundex 790 is the trade name for a plasticizer sold by Sun Oil Company; Sunproof Improved is the trade name for an antiozonant sold by Uniroyal Chemical Company; and Wingstay 100 is the trade name for a stabilizer comprising mixed diaryl-p-phenylene diamines sold by Goodyear Tire and Rubber Company.

The invention will be more readily understood by reference to the following examples which describe the detailed preparation of representative compounds. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLE 1

In this example there is employed a suitable reaction apparatus provided with means for supplying the combustion gas-producing reactants, i.e., a fuel and an oxidant stream, either as separate streams or as pre-combusted gaseous reaction products, and also means for supplying both the carbon black-yielding hydrocarbon feedstock and the auxiliary hydrocarbon to the apparatus. The apparatus may be constructed of any suitable material such as metal and either provided with a refractory insulation or surrounded by means for cooling such as a recirculating liquid which is preferably water. Additionally, the reaction apparatus is equipped with temperature and pressure recording means, means for quenching the carbon black-forming reaction such as spray nozzles, means for cooling the carbon black product and means for separating and recovering the carbon black from other undesired by-products. Accordingly, in carrying out the present process for preparing the high structure blacks of this invention, the following procedure is employed. In order to obtain the desired first stage flame, there are charged into a combustion zone of the apparatus through one or more inlets air preheated to 750°F at a rate of 85.0 m.s.c.f.h. and natural gas at a rate of 6.09 m.s.c.f.h. thereby generating a stream of combustion gases flowing in a downstream direction at a high linear velocity which possesses a kinetic head of at least 1.0 p.s.i. In this instance, the percent primary or first stage combustion is 147%. The rapidly flowing stream of combustion gases is passed into a second or transition stage which is of smaller cross-sectional diameter in order to increase the linear velocity of the stream of combustion gases. There is then introduced substantially transversely into the resultant stream of hot combustion gases having the desired kinetic head a carbon black-yielding hydrocarbon feedstock through four inlets each of which has a size of 0.04 inch located peripherally to the stream of combustion gases at a rate of 134.9 gallons per hour and under a pressure of 252 p.s.i.g. The hydrocarbon feedstock utilized is Shamrock thermal tar which is a fuel having a carbon content of 91.4% by weight, a hydrogen content of 8.37% by weight, a sulfur content of 0.48% by weight, a hydrogen to carbon ratio of 1.09, a B.M.C.I. Correlation Index of 118, a specific gravity of 1.07 in accordance with ASTM D-287, an API gravity in accordance with ASTM D-287 of +1.2, an SSU viscosity (ASTM D-88) at 130°F of 53.9 an SSU viscosity (ASTM D-88) at 210°F of 0.06, and an asphaltenes content of 5.7%. The reaction is carried out at an overall combustion of 31.9% and the reaction is quenched with water by quenching means located at a point 12.5 feet downstream of the location of primary make injection. There is obtained a carbon black having an iodine adsorption number of 90, an iodine surface area of 70 m²/g, a tint value of 229%, a DBP absorption value on fluffy blacks of 149, a DEP adsorption value on pellets of 124, a pH of 9.5 and a pour density of 20.5 lbs/cu.ft. This black is utilized herein as a control sample wherein no auxiliary hydrocarbon is added.

EXAMPLE 2

Following the procedure of Example 1, there are charged to a combustion zone air preheated to 750°F at a rate of 85.0 m.s.c.f.h. and natural gas at a rate of 6.07 m.s.c.f.h. to produce the desired first stage combustions. The first stage combusion is 147 percent. The combustion gases are then passed into a second stage of smaller cross-sectional diameter where there is injected the primary hydrocarbon make, Shamrock thermal tar, at a rate of 140.7 gallons per hour and under a pressure of 230 p.s.i.g., through four orifices each of which has a diameter of 0.04 inch. At a location 3 feet downstream of the point of injection of the primary hydrocarbon make, which is within the zone of substantial reaction as herein defined, there is introduced Shamrock thermal tar as an auxiliary hydrocarbon at a rate of 21.7 gallons per hour. In this instance, the auxiliary hydrocarbon is introduced through the side of the reactor and into the combustion gases thereof by means of an annular, water-cooled probe equipped with a 60° Monarch spray tip having an orifice diameter of 0.02 inch. The reaction is carried out at an overall percent combustion of 30.8% and the reaction is quenched with water at a point 13.5 feet downstream from point of make injection. There is obtained a black having analyticals similar to those of the control of Example 1 in all respects except a markedly higher structure as evidenced by a pelleted black DBP increase of 17 points. The amount of auxiliary hydrocarbon employed in this example, calculated as shown hereinbefore, is such that the carbon content of the auxiliary hydrocarbon is 11.6% by weight based on the total carbon content of the reactants.

EXAMPLE 3

In accordance with the procedure of Example 2, air preheated to 750°F at a rate of 85.0 m.s.c.f.h. and natural gas at a rate of 6.08 m.s.c.f.h. are combined to provide a first stage combustion of 147%. The hot combustion gases flow into a second or transition stage where primary hydrocarbon make, i.e., Shamrock thermal tar, is forcefully introduced through four orifices having a diameter of 0.04 inch at a rate of 141.5 gallons per hour and under a pressure of 300 p.s.i.g. into the heart of the combustion gas stream. In this case, at a point 4 feet downstream of the make injection, there is injected utilizing the water-cooled probe and spray of Example 2 as auxiliary hydrocarbon Shamrock thermal tar at a rate of 21.7 gallons per hour. This amount of auxiliary hydrocarbon is such that the carbon content thereof is 11.6% by weight based on the total carbon content of the reactants. The reaction conditions are maintained so as to produce an overall percent combustion of 30.6% and the quench is carried out at a point 18.5 feet downstream of the primary make injection. As a result there is obtained a black having similar analyticals to the control of Example 1, such as an iodine surface area of 71 m²/g, a tint of 233% and a pH of 8.6. However, as in Example 2, the black produced hereby has noticeably higher structure characteristics as indicated by an increase of 14 points in both pelleted black and fluffy black DBP levels.

EXAMPLE 4

In Examples 4–7, there is demonstrated the production of a black of the type made in Example 1 wherein the first stage combustion is lowered to 126% and auxiliary hydrocarbon injection is utilized in accordance with the teachings of the present invention in order to raise the structure level of the black. Specifically, there are charged to a combustion zone, following the procedure of Example 2, air preheated to 750°F at a rate of 85.0 m.s.c.f.h. and natural gas at a rate of 7.09 m.s.c.f.h. to provide the desired flame wherein the primary combustion is 126%. The resultant hot gaseous combustion products flow downstream into a second or transition stage where there is introduced into the combustion gases a primary hydrocarbon make oil, namely, Shamrock thermal tar. More specifically, the primary hydrocarbon make is fed in at a rate of 138.8 gallons per hour through four orifices each of which has a diameter size of 0.04 inch under a pressure of 220 p.s.i.g. At a point 3 feet downstream of the location of injection of make oil, there is introduced additional Shamrock thermal tar at a rate of 21.7 gallons per hour, which corresponds to an amount of hydrocarbon having a carbon content that is 11.5% by weight based on the total carbon content of the reactants. The carbon forming reaction is carried out an overall combustion of 30.1% and termination of the reaction by quenching occurs 13.5 feet downstream of the make oil injection. There is hereby produced a carbon black having analyticals similar to the control sample of Example 1 in that the iodine surface area is 69 m²/g, the tint is 235% and the pH is 8.8. However, as in Examples 2 and 3, the injection of the auxiliary liquid hydrocarbon, in precise amounts and at proper distance, results in a pelleted black DBP increase of 28 points, which, of course, is an indication of a black having the desired higher structure.

EXAMPLE 5

Following the procedure of Example 4, first stage combustion gases are produced by combining 85.0 m.s.c.f.h. of air preheated to 750°F with 7.08 m.s.c.f.h. of natural gas to provide a primary combustion fire of 126%. The hot gases emanating from this first stage flow in a downstream direction into a transition stage where the primary hydrocarbon make at a rate of 138 gallons per hour is forcefully injected into the heart of the combustion gas stream from the periphery thereof. The primary hydrocarbon make utilized is Shamrock thermal tar and it is injected through four orifices of 0.04 inch diameter size under a pressure of 220 p.s.i.g. into the gas stream. In this instance, an auxiliary amount of Shamrock thermal tar is introduced at the same rate as in Example 4 of 21.7 gallons per hour which corresponds to a carbon content of 11.5% by weight of the total carbon content of the reactants. The auxiliary hydrocarbon is introduced at a distance 4 feet downstream of the make oil injection rather than 3 feet downstream as in the prior example. The reaction conditions are maintained so that the overall combustion of the carbon forming process is 30.2% and the quenching occurs at a point 18.5 feet downstream of the location of make oil injection. There is obtained a carbon black having analyticals similar to the control of Example I in all respects except for the desired higher structure level as evidenced by a pelleted black DBP increase of 30 points and a fluffy black DBP increase of 26 points. In regard to the other analyticals, the black has an iodine surface area of 70 m²/g, a tint of 239% and a pH of 8.8.

EXAMPLE 6

The procedure of Example 5 is followed in every respect except for the following details. The primary feedstock make is introduced at a rate of 135.0 gallons per hour which increases slightly the ratio of auxiliary hydrocarbon added such that the carbon content becomes 11.7% rather than 11.5% by weight based on the total carbon content of the reactants. Additional minor modifications include injection of the make under a pressure of 370 p.s.i.g. and overall combustion of the process of 30.7%. The most significant change involves the addition of the auxiliary hydrocarbon at a point 5 feet downstream of the make oil injection. As a result of this modification there is obtained a carbon black having analyticals almost identical to those of the black of Example 4 but for a much lower structure level. It should be noted, however, that the black of this example still has a pelleted black DBP of 139 which is 15 points higher than the control sample of Example 1. The remaining analyticals for the black are an iodine surface area of 69 m²/g, a tint of 235% and a pH of 8.9.

EXAMPLE 7

In this example there is employed essentially the same operating conditions as in Example 5. Instead of the procedure described, the primary make is introduced at a rate of 134.4 gallons per hour under a pressure of 255 p.s.i.g. The major modification demonstrated involves the introduction of auxiliary hydrocarbon at a rate of 24.5 gallons per hour which is an amount such that the carbon content of the auxiliary hydrocarbon is 13.1% by weight based on the total carbon content of the reactants. The introduction is made, as in Example 5, at a point 4 feet downstream of the make oil injection. The carbon black produced has an iodine surface area of 70 m²/g, a tint of 239%, a pH of 8.7, and a pelleted black DBP of 157. It is thus apparent that, while the black of this example has a significantly higher structure level than the control sample, yet it is only 3 points higher in DBP than the black of Example 5. Therefore, the higher input of auxiliary hydrocarbon did produce a further increase in structure but only to a small extent. A roadwear rating of 101% was obtained on the black of this example.

For purposes of convenience, the data shown in Examples 1–7 are tabulated below in Table I. Also shown are the rubber properties of the blacks of Examples 1–7 in both industry synthetic rubber formulations (ISR) and natural rubber formulations (NR).

The suitability of the blacks of the present invention as reinforcing agents for rubber compositions is clearly shown by the following examples. In carrying out the examples, the rubber compositions are readily prepared by conventional mechanical methods. For example, the rubber and the carbon black reinforcing agent are intimately admixed together on a conventional mixing machine of the type normally used for mixing rubber or plastics such as a Banbury mixer and/or roll mill in order to insure satisfactory dispersion. The rubber compositions are compounded according to standard industry formulations for both a natural rubber and synthetic rubber-containing formulation. The resulting vulcanizates to be treated are cured at 293°F for 30 minutes when natural rubber is used and for 50 minutes when a synthetic rubber, styrene-butadiene rubber in this instance is employed. In evaluating the performance of the carbon blacks of the present invention, the following formulations are utilized wherein the quantities are specified in parts by weight.

| Ingredient | Natural Rubber Recipe | Synthetic Rubber Recipe |
| --- | --- | --- |
| Polymer | 100 (natural rubber) | 100 (styrene-butadiene) |
| Zinc oxide | 5 | 5 |
| Sulfur | 2.5 | 2.0 |
| Stearic acid | 3 | 1.5 |
| Altax (MBTS) | 0.6 | 2.0 |

-continued

| Ingredient | Natural Rubber Recipe | Synthetic Rubber Recipe |
| --- | --- | --- |
| Carbon black | 50 | 50 |

With regard to the above, Altax (MBTS) is the trade name of R. T. Vanderbilt Company for mercaptobenzothiazyl disulfide accelerator.

In the following table there is demonstrated the advantageous and unexpected results achieved by the use of the carbon black products described hereinabove as additives in rubber formulations. It will, of course, be apparent that the table, while being illustrative of the present invention, should not be construed as limiting or restrictive in any way.

there is produced a 112% primary combustion fire by combining 85.0 m.s.c.f.h. of air preheated to 750°F with 8.28 m.s.c.f.h. natural gas. The liquid hydrocarbon make feedstock is forcefully injected under a pressure of 312 p.s.i.g. through eight orifices each having a diameter size of 0.03 inch into the interior of the combustion gas stream at a rate of 141 gallons per hour. The make hydrocarbon utilized in Examples 8–10 is Sunray DX which is a fuel having a carbon content of 91.1% by weight, a hydrogen content of 7.9% by

TABLE I

ANALYTICAL PROPERTIES OF CARBON BLACKS

| Carbon Black Sample | Iodine Number | Iodine Surface Area, m²/g | Tinting Strength, % SRF | pH | DBP Absorption cc/100 g on Pellets | Pour Density, lbs./cu.ft. | Amount of Auxiliary Hydrocarbon, % Carbon | Pt. of Aux. to Make Inj. | DBP Abs. cc/100 g on Fluffy |
| --- | --- | --- | --- | --- | --- | --- | --- | --- | --- |
| Example 1 | 90 | 70 | 229 | 9.5 | 124 | 20.5 | — | — | 149 |
| Example 2 | 90 | 72 | 235 | 8.7 | 141 | 19.2 | 11.6 | 3 | 160 |
| Example 3 | 89 | 71 | 233 | 8.6 | 138 | 19.3 | 11.6 | 4 | 163 |
| Example 4 | 84 | 69 | 235 | 8.8 | 152 | 18.7 | 11.5 | 3 | 165 |
| Example 5 | 90 | 70 | 239 | 8.8 | 154 | 18.8 | 11.5 | 4 | 175 |
| Example 6 | 87 | 69 | 235 | 8.9 | 139 | 19.9 | 11.7 | 5 | 155 |
| Example 7 | 90 | 70 | 239 | 8.7 | 157 | 18.6 | 13.1 | 4 | 177 |

PHYSICAL PROPERTIES OF NATURAL AND SYNTHETIC RUBBER FORMULATIONS*

| Carbon Black Sample | Ex. 1 | Ex. 2 | Ex. 3 | Ex. 4 | Ex. 5 | Ex. 6 | Ex. 7 |
| --- | --- | --- | --- | --- | --- | --- | --- |
| | NATURAL RUBBER RECIPE (NR) | | | | | | |
| Tensile, p.s.i. (ASTM D-412) | −210 | −120 | −130 | −200 | −110 | −90 | −120 |
| 300% Modulus, p.s.i. (ASTM D-412) | +370 | +630 | +560 | +640 | +610 | +600 | +760 |
| | SYNTHETIC RUBBER RECIPE (ISR) | | | | | | |
| Tensile, p.s.i. (ASTM D-412) | +360 | +270 | +50 | +230 | −20 | −70 | +10 |
| Mooney Viscosity (ASTM D-1646) | +6 | +11 | +8 | +10 | +11 | +7 | +12 |
| Extrusion Shrinkage, % IRB No. 3 | 93.6 | 87.1 | 87.3 | 85.2 | 84.5 | 87.8 | 83.8 |

*All of the above rubber physical data is expressed relative to IRB No. 3 (Industry Reference Black No. 3)

It will be seen from the above data that the structure level of carbon blacks can be markedly increased by the injection of an auxiliary hydrocarbon. In this instance, the auxiliary hydrocarbon is in liquid form and the injection is closely controlled both as to the amount utilized and the location of injection. Moreover, in addition to increasing the pelleted black DBP by 14–33 points in this series of experiments, the modified blacks impart significantly increased modulus properties to natural rubber formulations. In the case of the industry synthetic rubber formulations, the lower extrusion shrinkage values are indicative of the use of more highly structured blacks. It is also noteworthy that the structure increase produced by injection of an auxiliary liquid hydrocarbon is not accompanied by any adverse effect on the economics of the carbon forming process as, for example, a reduction in throughput and/or carbon efficiency.

EXAMPLE 8

In Examples 8, 9 and 10 there is further demonstrated the principle of the present invention, i.e., raising the structure of a carbon black, wherein greater amounts of auxiliary liquid hydrocarbon are utilized. In this instance, a control black having an iodine surface area of 72.4 m²/g, a tint of 230% and a DBP absorption of 135 is prepared in accordance with the procedure of Example 1 except for the differences hereinafter described. In the first stage of the carbon forming process weight, a sulfur content of 1.3% by weight, a hydrogen to carbon ratio of 1.04, a B.M.C.I. Correlation Index of 133, a specific gravity in accordance with ASTM D-287 of 1.09, an API gravity in accordance with ASTM D-287 of −2.6, an SSU viscosity (ASTM D-88) at 130°F of 350, an SSU viscosity (ASTM D-88) at 210°F of 58 and an asphaltenes content of 5.7 percent. The reaction conditions used in this instance are such as to provide an overall combustion of 28.9% and the reaction is quenched with water at a point 10.5 feet downstream of the location of make injection.

EXAMPLE 9

Utilizing the procedure of Example 8, a primary combustion fire of 112% is produced. Thereafter, Sunray DX feedstock is injected into the gas stream, under a pressure of 220 p.s.i.g. and at a rate of 106 gallons per hour, through eight orifices having a diameter size of 0.03 inch. In this instance, auxiliary Sunray DX oil is introduced at a rate of 25 gallons per hour into the combustion stream at a point 4 feet downstream of make injection. The reaction conditions are maintained so as to result in an overall combustion of 30.5% and the quenching operation is performed at a point 18.5 feet downstream of make injection. The black produced in this example, where the carbon content of the auxiliary hydrocarbon is 15.2% by weight of the total carbon content of the reactants, has an iodine surface area of 74.2 m²/g, a tint of 230% and a pelleted black DBP of 169, which is a 34 point increase in structure as compared to the control black of Example 8.

EXAMPLE 10

A primary combustion fire of 112% is produced in the manner shown in Example 8. The Sunray DX make hydrocarbon is then introduced, as in the preceding Examples 8 and 9, under a pressure of 190 p.s.i.g. through eight orifices of a diameter size of 0.03 inch at a rate of 99 gallons per hour. At a point 6 feet downstream of the make injection, there is injected an additional amount of Sunray DX at a rate of 25 gallons per hour so that the carbon content of the auxiliary hydrocarbon is 15.9% by weight of the total carbon content of the reactants. The reaction is carried out at an overall combustion of 31.8% and the quench occurs at a point 18.5 feet downstream of the make injection. The black produced hereby has an iodine surface area of 73.7 m²/g, a tint of 228% and a pelleted black DBP of 169. In this case, it is evident that the additional downstream distance of auxiliary oil injection resulted in no further structure improvement than that shown in Example 9. The data of Examples 8, 9 and 10, as well as rubber properties, are conveniently summarized and given in Table II herebelow.

ter size of 0.05 inch under a pressure of 267 p.s.i.g. at a rate of 458 gallons per hour. At the same location where the make hydrocarbon is injected, there is added in an axial direction downstream an auxiliary amount, i.e., 182 gallons per hour of the same oil used as make, by suitable means such as a water-cooled probe. The oil used as make and auxiliary is Clark decant oil which is a fuel having a carbon content of 90.9% by weight, a hydrogen content of 8.04% by weight, a sulfur content of 1.3% by weight, a hydrogen to carbon ratio of 1.05, a B.M.C.I. Correlation Index of 121, a specific gravity in accordance with ASTM D-287 of 1.07, an API gravity in accordance with ASTM D-287 of 0.9, an SSU viscosity (ASTM D-88) at 130°F of 150.8, an SSU viscosity (ASTM D-88) at 210°F of 44.7 and an asphaltenes content of 2.1%. The reaction conditions are maintained so that the overall combustion is 31% and the quench is carried out at a point 11 feet downstream of the make injection. As a result of the use of the auxiliary injection technique herein described, there is produced in good yield a black having an iodine number of 92, an iodine surface area of 74 m²/g, a tint of 237%, a pour density of 18.6 lbs/cu.ft and a DBP of 155 cc/100 g on pelleted black which is 25 points higher than the control of following Example 12. The rubber

TABLE II

ANALYTICAL AND PHYSICAL PROPERTIES OF CARBON BLACKS

| Carbon Black Sample | Example 8 | Example 9 | Example 10 |
|---|---|---|---|
| Iodine Surface Area, m²/g | 72.4 | 74.2 | 73.7 |
| Iodine Number, m²/g | 89 | 89 | 86 |
| Tinting Strength, % SRF | 230 | 230 | 228 |
| DBP Absorption, cc/100 g on pelleted blacks | 135 | 169 | 169 |
| DBP Absorption, cc/100 g on fluffy blacks | 168 | 200 | 205 |
| Density, lbs/cu.ft. | 20.2 | 18.8 | 18.2 |
| Auxiliary Hydrocarbon, % Carbon | — | 15.2 | 15.9 |
| Distance from Injection of Make to Injection of Auxiliary Hydrocarbon, feet | — | 4 | 6 |
| NATURAL RUBBER RECIPE (NR)* | | | |
| Tensile, p.s.i. (ASTM D-412) | −30 | −110 | −210 |
| Modulus, p.s.i. (ASTM D-412) | +470 | +690 | +660 |
| INDUSTRY SYNTHETIC RUBBER RECIPE (ISR)* | | | |
| Tensile, p.s.i. (ASTM D-412) | +50 | +80 | −20 |
| Modulus, p.s.i. (ASTM D-412) | +560 | +800 | +740 |
| Mooney Viscosity (ASTM D-1646) | +8 | +13 | +11 |
| Extrusion Shrinkage, % IRB No. 3 | 93.1 | 82.6 | 83.2 |

*All of the above rubber physical data are expressed relative to IRB No. 3

EXAMPLE 11

The purpose of Examples 11 and 12 is to demonstrate another embodiment of the present invention. In particular, these two examples show clearly that the structure level of a given carbon black is substantially increased as a result of injecting auxiliary hydrocarbon at the same point as the injection of make hydrocarbon. This will become more distinct from the following detailed information relating to the processing operations. Into a suitable apparatus, as in Example 1, air preheated to 720°F and at a rate of 421,000 s.c.f.h. is combined with 37,000 s.c.f.h. of natural gas in the first stage to provide hot combustion gases. The gas stream flows in a downstream direction into the transition zone where the make hydrocarbon oil is injected into the heart of the stream through 11 orifices having a diamephysicals include, in natural rubber, a 300% modulus of +550 p.s.i., and a tensile strength of −130 p.s.i. and, in the industry synthetic rubber formulation, a 300% modulus of +1000 p.s.i., a tensile strength of +690 p.s.i. and an extrusion shrinkage of 84.1 percent. The reported rubber physical properties are expressed relative to Industry Reference Black No. 3. The roadwear rating on the black of this example is 104 percent.

EXAMPLE 12

Following the procedure of Example 11, air preheated to 800°F is combined at a rate of 450 m.s.c.f.h. with natural gas fed in at a rate of 36 m.s.c.f.h. to provide a primary combustion fire of 125%. The hot gaseous combustion products are then passed downstream into a transition stage where make hydrocarbon oil is injected forcefully under a pressure of 300 p.s.i.g.

through nine orifices each having a diameter of 0.06 inch at a rate of 642 gallons per hour into the heart of the combustion gas stream. The reaction is maintained so as to provide an overall combustion of 33% and the quench to 1250°F is carried out at a point 7 feet downstream of the location of make oil injection. The black produced herein has an iodine number of 90, a density of 20 lbs/cu.ft, an iodine surface area of 71 m$^2$/g, a tint of 235% and a DBP adsorption on pelleted blacks of 130. When this black is incorporated into the natural rubber formulation, the 300% modulus value is +420 p.s.i. and the tensile strength is essentially the same as that of the IRB No. 3 control. The values for the industry synthetic rubber formulation using this black include a 300% modulus of +800 p.s.i., a tensile of +300 p.s.i., and a Mooney viscosity of +8 when compared to the IRB No. 3 control. The roadwear rating obtained on this black is 100 percent.

EXAMPLE 13

In Examples 13 through 15, there is provided a series of experimental runs wherein natural gas is utilized as an auxiliary hydrocarbon. As will be apparent from the operating conditions, the following examples were designed to show the effect of varying the location of the auxiliary gas injections while maintaining approximately constant the amount of auxiliary gas introduced. The control sample of Example 1 serves as an adequate control for the following blacks also. More particularly, following the procedure of Example 1, a primary combustion fire of 140% is prepared by combining 85.0 m.s.c.f.h. of air preheated to 750°F with 6.09 m.s.c.f.h. of natural gas. Into the hot combustion gases, there is then introduced through four orifices each having a diameter of 0.04 inch under a pressure of 206 p.s.i.g. a make hydrocarbon feedstock oil at a rate of 123.8 gallons per hour. The make hydrocarbon used herein is Shamrock tar having a carbon content of 90.7% by weight, a hydrogen content of 8.35% by weight, a sulfur content of 0.5% by weight, a hydrogen to carbon ratio of 1.09, a B.M.C.I. Correlation Index of 118, a specific gravity in accordance with ASTM D-287 of 1.06, an API gravity in accordance with ASTM D-287 of 2.0, an SSU viscosity (ASTM D-88) at 130°F of 252, an SSU viscosity (ASTM D-88) at 210°F of 53.8, and an asphaltenes content of 5.7%. There is then injected into the combustion gas stream natural gas at a rate of 2.43 m.s.c.f.h. which is an amount such that the carbon content of the auxiliary natural gas hydrocarbon is 6.2% by weight of the total carbon content of the reactants. The introduction of the auxiliary natural gas at a point 2 feet downstream of make injection is achieved by any suitable means such as, in this instance, a ½ inch diameter water-cooled pipe fitted with a 11/32 inch diameter Monarch spray tip. The reaction conditions are maintained so as to provide an overall reaction combustion of 31.1% and the quench is carried out at a point 18.5 feet downstream of the location of make oil injection. There is hereby obtained in good yield a black having an iodine number of 90, an iodine surface area of 69.3 m$^2$/g, a tint of 229%, a density of 19 lbs/cu. ft, a DBP adsorption on pellets of 145 cc/100 g carbon black and a fluffy DBP absorption of 168. Additional data pertaining to this black will be given below in Table III.

EXAMPLE 14

The procedure of Example 13 is repeated except for introducing make oil hydrocarbon at a rate of 130.6 gallons per hour under a pressure of 227 p.s.i.g. and most importantly, introducing the auxiliary natural gas, at the same rate of 2.43 m.s.c.f.h., which in this instance is an amount such that the carbon content of the auxiliary gas is 5.9% by weight of the total carbon content of the reactants, at a point 3 feet downstream of the make oil injection. The overall reaction combustion is 30% and the quench occurs at a point 18.5 feet downstream of make oil injection. The black produced is similar to that of the previous Example 13 in having an iodine number of 91, a density of 18.7 lbs/cu.ft, an iodine surface area of 71 m$^2$/g and a tint of 232%. However, while the structure is markedly higher than that of the control, the black of Example 14 has a DBP value for fluffy and pelleted black lower than the black of Example 13. Further data appear in Table III.

EXAMPLE 15

The procedure of Example 13 is followed with the exceptions that make oil is injected at a rate of 134.9 gallons per hour under a pressure of 245 p.s.i.g. and the auxiliary natural gas, at a rate of 2.43 m.s.c.f.h., is introduced at a point 4 feet downstream of the make oil injection. The carbon content of the auxiliary natural gas used in this reaction is 5.8% by weight of the total carbon content of the reactants. The overall combustion is 29.3% and the carbon formation reaction is terminated by quenching at a point 20.5 feet downstream of the injection of make hydrocarbon. The black prepared in this manner has similar analyticals such as an iodine number of 90, a density of 19.4 lbs/cu.ft, an iodine surface area of 69.3 m$^2$/g and a tint of 227%. As in the last example, the structure is lower than that of the black described in Example 13. Complete data are tabulated in Table III.

TABLE III

ANALYTICAL AND PHYSICAL PROPERTIES OF CARBON BLACKS

| Carbon Black Sample | Example 1 | Example 13 | Example 14 | Example 15 |
|---|---|---|---|---|
| ASTM Iodine Number | 90 | 90 | 91 | 90 |
| Iodine Surface Area, m$^2$/g | 70 | 69.3 | 71 | 69.3 |
| Pour Density, lbs./cu.ft. | 20.5 | 19 | 18.7 | 19.4 |
| Tinting Strength, % SRF | 229 | 229 | 232 | 227 |
| DBP Absorption, cc/100 g on pellets | 124 | 145 | 139 | 134 |
| DBP Absorption, cc/100 g on fluffy black | 149 | 168 | 163 | 157 |

TABLE III-continued
ANALYTICAL AND PHYSICAL PROPERTIES OF CARBON BLACKS

| Carbon Black Sample | Example 1 | Example 13 | Example 14 | Example 15 |
|---|---|---|---|---|
| NATURAL RUBBER RECIPE (NR)* | | | | |
| 300% Modulus, p.s.i. | +285 | +460 | +460 | +400 |
| Tensile, p.s.i. | −130 | +20 | −135 | −260 |
| INDUSTRY SYNTHETIC RUBBER RECIPE (ISR)* | | | | |
| 300% Modulus, p.s.i. | +550 | +780 | +880 | +730 |
| Tensile, p.s.i. | +300 | +50 | +95 | +70 |
| Extrusion Shrinkage, % | 91.9 | 86.8 | 90.5 | 90.2 |

*All of the above rubber data are expressed relative to IRB No. 3.

From the above data it will be seen that the injection of an auxiliary amount of natural gas did provide a significant improvement in the structure of the carbon blacks produced. This is, of course, reflected by the DBP increase of 10 to 20 points. It also becomes evident from the data that the actual location of auxiliary hydrocarbon injection is quite important since the optimum structure increase is found to occur when a gaseous hydrocarbon is introduced at a point 2 feet downstream of the location of injection of make feedstock. In respect to the rubber physical properties, all natural and synthetic rubber properties were not adversely affected and, as anticipated, the increasing DBP levels of the blacks resulted in the preparation of rubber compounds having exceptionally high modulus properties.

EXAMPLE 16

In Examples 16 and 17 there is a further showing that the advantages of the present invention are found also in the preparation of blacks having higher iodine numbers and higher surface areas than those of the earlier examples. In accordance with the procedure of Example 1, there are charged to a combustion zone 85.0 m.s.c.f.h. of air preheated to a temperature of 585°F and natural gas at a rate of 7.74 m.s.c.f.h. so as to generate a primary combustion fire of 110 percent. The hot combustion gases are then permitted to flow in a downstream direction at a high linear velocity following which a make hydrocarbon feedstock oil is introduced into the stream through four orifices each having a diameter of 0.035 inch under a pressure of 183 p.s.i.g. and at a rate of 90.6 gallons per hour. The make hydrocarbon used herein is Shamrock tar feedstock as described fully in Example 13. The reaction conditions are maintained so as to provide an overall reaction combustion of 39.2% and the quench is carried out at a point 4 feet downstream of the location of make oil injection. There is obtained in good yield a black having an iodine number of 123, an iodine surface area of 98 m²/g, a tint of 272%, a density of 20 lbs./cu. ft., and a DBP adsorption on pellets of 129 cc/100 gms. of black. Additional data pertaining to this black will be given below in Table IV.

EXAMPLE 17

The procedure of Example 16 is repeated except for the following. Air preheated to 800°F is introduced at a rate of 100 m.s.c.f.h. along with natural gas at a rate of 8.42 m.s.c.f.h. to provide a primary combustion fire of 126 percent. Into the fast moving hot combustion gases there is then introduced the primary make feedstock oil, Shamrock tar, at a rate of 127 gallons per hour through four orifices of diameter size 0.037 inch and under a pressure of 300 p.s.i.g. There is then introduced into the combustion stream an additional amount of Shamrock tar hydrocarbon oil at a rate of 24.5 gallons per hour which is an amount such that the carbon content of the auxiliary oil is 13.2% by weight of the total carbon content of the reactants. The introduction of the auxiliary oil at a point 4 feet downstream of make injection is achieved by entry through the side of the reactor and into the combustion gases thereof by means of an annular, water-cooled probe equipped with a 60° Monarch spray tip having an orifice diameter of 0.02 inch. The reaction is carried out at an overall percent combustion of 36.1% and the reaction is quenched at a point 10.5 feet downstream of make oil injection. There is obtained in a good yield a black having an iodine number of 116, an iodine surface area of 98 m²/g, a tint of 252%, a DBP absorption on pellets of 161 cc/100 gms. black, which is a significant increase of 32 points as compared to the control black of Example 16, and a DBP absorption on fluffy black of 180. Further data is shown in Table IV.

Table IV
ANALYTICAL AND PHYSICAL PROPERTIES OF CARBON BLACKS

| Carbon Black Sample | Example 16 | Example 17 |
|---|---|---|
| ASTM Iodine Number | 123 | 116 |
| Iodine Surface Area, m²/g | 98 | 98 |
| Tinting Strength %SRF | 272 | 252 |
| DBP Absorption cc/100 gms on pellets | 129 | 161 |
| DBP Absorption cc/100 gms. on fully black | 154 | 180 |
| NATURAL RUBBER RECIPE (NR)* | | |
| 300) Modulus, p.s.i. | +410 | +160 |
| Tensile, p.s.i. | +180 | −140 |
| INDUSTRY SYNTHETIC RUBBER RECIPE (ISR)* | | |
| 300% Modulus, p.s.i. | +620 | +700 |
| Tensile, p.s.i. | +320 | +190 |
| Extrusion Shrinkage, % | 90.2 | 81.9 |

*All of the above rubber data are expressed relative to IRB No. 3

From the above it is again apparent that a well defined injection of an auxiliary amount of hydrocarbon provided a significant increase in the structure level of the blacks. As indicated by the present invention, the DBP absorption level of the black markedly increased. Moreover, the modulus and extension shrinkage of the rubber compositions behave in the manner expected when a high structure black is substituted for a lower structure black.

In the following examples 18–26 there is described a series of blacks prepared by the process of this invention wherein the amount of the auxiliary hydrocarbon utilized ranges from about 15 to about 55% by weight expressed as percent carbon of the reactants. In each instance the structure of the blacks is raised considerably as evidenced by DBP increases, on pelleted blacks, varying from 10 to 70 points. As a control sample for these blacks there is used the black of Example 18.

EXAMPLE 18

In accordance with the procedure of Example 1, air preheated to 800°F at a rate of 340,000 SCFH and natural gas at a rate of 25,600 SCFH are fed into the combustion zone of the reaction apparatus. To the resultant downstream flow of hot combustion gases there is charged Gulf Oil hydrocarbon feedstock under a pressure of 200 p.s.i.g. at a rate of 547 gallons per hour. The reaction is carried out at an overall combustion of 30.7% and the combustion products are quenched with water to 1300°F. There is obtained a carbon black product having a tinting strength of 235, an iodine surface area of 72, a DBP absorption value of 131, a density of 20 lbs./cu. ft. and an iodine number of 90. The hydrocarbon feedstock employed herein is Gulf Oil which is a fuel having a carbon content of 90.3% by weight, a hydrogenation content of 7.9% by weight, a sulfur content of 1.9% by weight, a hydrogen to carbon ratio of 1.04, a B.M.C.I. Correlation Index of 126, a specific gravity in accordance with ASTM D-287 of 1.07, an API gravity in accordance with ASTM D-287 of 0.4, an SSU viscosity (ASTM D-88) at 130°F of 95.2, an SSU viscosity (ASTM D-88) at 210°F of 40.4 and an asphaltenes content of 2.5 percent. Additional data on this black appears in Table V.

EXAMPLE 19

Following the procedure of Example 1, a primary combustion fire of 113% is prepared by combining 85.0 m.s.c.f.h. of air preheated to 750°F with 7.54 m.s.c.f.h. of natural gas. Into the hot combustion gases, there is then injected, under a pressure of 320 p.s.i.g., through four orifices each having a diameter of 0.037 inch as a make hydrocarbon oil Sunray DX as described in Example 8 herein at a rate of 118 gallons per hour. Subsequently, there is injected from the periphery, as in the case of the make oil, into the combustion gas stream additional Sunray DX fuel at a rate of 27 gph which is an amount such that the carbon content of the auxiliary hydrocarbon is 15.5% by weight of the total carbon content of the reactants. The introduction or the axuiliary hydrocarbon, which occurs in this example at a point 2.75 feet downstream of make injection, is achieved by injection substantially transversely from the periphery through four orifices of diameter size 0.025 inch under a pressure of 220 p.s.i.g. The reaction conditions are maintained so as to provide an overall reaction combustion of 28.5% and the quench is carried out on a point 15 feet downstream of the location of make oil injection. Further details on the black are found in Table V.

EXAMPLE 20

The procedure of Example 19 is repeated with the following exceptions. The make hydrocarbon is injected, under a pressure of 325 p.s.i.g., through four orifices of diameter size 0.031 inch at a rate of 80 g.p.h. and the auxiliary fuel injected at a rate of 60 g.p.h. through four orifices of 0.025 inch under a pressure of 265 p.s.i.g. The amount of auxiliary hydrocarbon used, accordingly, is such that the carbon content of the auxiliary fuel in 35.5% by weight of the total carbon content of the reactants. The overall reaction combustion is 29.1% and the quench occurs at a point 17 feet downstream of make oil injection. The black is further described in Table V.

EXAMPLE 21

The procedure of Example 20 is followed with the exceptions that make oil is injected at a rate of 52 gph through four orifices of 0.025 inch diameter under a pressure of 260 p.s.i.g. and also that the auxiliary oil is introduced through four orifices of 0.029 inch size under a pressure of 210 p.s.i.g. The amount of auxiliary hydrocarbon used herein is such that the carbon content of the auxiliary oil is 47.4% by weight of the total carbon content of the reactants. The overall reaction combustion is 31.8% and the quench occurs at a point 17 feet downstream of make oil injection. The black obtained is further described in Table V.

EXAMPLE 22

The procedure of Example 19 is repeated except as follows. The make hydrocarbon at a rate of 120 gph is injected peripherally, under a pressure of 350 p.s.i.g., through four orifices of diameter size 0.035 inch. There is then added peripherally through two orifices of 0.025 inch size under a pressure of 100 p.s.i.g. auxiliary hydrocarbon at a rate of 25 gph, which corresponds to a carbon content of 16.7% by weight of the total carbon content of the reactants. In the example, as well as in Examples 22–25, the auxiliary hydrocarbon is introduced at a point 5.5 feet downstream of the make oil injection. The overall reaction combustion is 33.6% and the quench is carried out at a point 24 feet downstream of make oil injection. Additional data on this black appears in Table V.

EXAMPLE 23

The procedure of Example 22 is followed in all respects except that make oil is introduced at a rate of 76 gph through four orifices of 0.031 inch size under a pressure of 245 p.s.i.g. and the auxiliary hydrocarbon is introduced through four orifices of 0.025 inch size under a pressure of 160 p.s.i.g. As mentioned hereinbefore, the auxiliary fuel is added at a point 5.5 feet downstream of make oil injection and is present in an amount such that the carbon content of the auxiliary fuel is 36.3% by weight of the total carbon content and the quench is carried out at a point 24 feet downstream of make oil injection. Additional details on this black are found in Table V.

EXAMPLE 24

Essentially the same procedure of Example 23 is followed except that the make hydrocarbon is injected at a rate of 87 gph through four orifices of 0.031 inch in size under a pressure of 325 p.s.i.g. The auxiliary hydrocarbon is added at the same rate and location as stated in Example 22 and the carbon content of the auxiliary oil is therefore 34% by weight of the total carbon content of the reactants. The overall reaction combustion is 32.2% and the reaction is quenched at a point 24 feet downstream of make oil injection. The black obtained hereby is described in more detail in Table V.

EXAMPLE 25

The procedure of Example 22 is followed except that the make hydrocarbon is introduced at a rate of 113 gph through four orifices of 0.033 inch in size under a pressure of 340 p.s.i.g. and the auxiliary hydrocarbon is injected at a rate of 46 gph through four orifices of 0.024 inch diameter size under a pressure of 100 p.s.i.g. This amount is such that the carbon content of the auxiliary hydrocarbon is 24.5% by weight of the total carbon content of the reactants, and as stated earlier the addition occurs at a point 5.5 feet downstream of make oil injection. The overall reaction combustion is 32.7% and the reaction is quenched at a point 24 feet downstream of make oil injection. Additional details are found in Table V.

EXAMPLE 26

The procedure of Example 25 is followed with the exception that the make hydrocarbon is introduced at a rate of 34 gph through three orifices of diameter size 0.025 inch under a pressure of 130 p.s.i.g. and the auxiliary hydrocarbon is injected at a rate of 68 gph through four orifices of 0.032 inch in size under a pressure of 190 p.s.i.g. at a point 5.5 feet downstream of the make oil injection. The carbon content of the auxiliary hydrocarbon used herein is 54.7% by weight of the total carbon content of the reactants. The overall reaction combustion is 39.7% and the quench occurs at a point 28.5 feet downstream of make oil injection. Further details on this black appear in Table V hereinbelow.

tion of additional amounts of hydrocarbon, the production of highly structured blacks is achieved. Moreover, by carefully selecting operating conditions from within the range shown to be suitable for use, the DBP absorption level of a given black may be increased by an amount of from 10 to about 70 points as desired. As expected, the blacks of higher structure impart to rubber compositions containing the same increased modulus and reduced extrusion shrinkage values.

While this invention has been described with respect to certain embodiments, it is not so limited, and it should be understood that variations and modifications thereof may be made which are obvious to those skilled in the art without departing from the spirt or scope of the invention.

The embodiments of the invention in which an exclusive property or privilege is claimed are defined as follows:

1. In a modular process for producing furnace carbon blacks having increased structure characteristics as represented by increased DBP values of the blacks and lower extrusion shrinkage values of rubber formulations containing said blacks wherein a fuel and an oxidant are reacted in a first stage so as to provide a stream of hot combustion gases possessing sufficient energy to convert a carbon black-yielding liquid hydrocarbon make to carbon black which stream is propelled at a high linear velocity into a second stage where the liquid hydrocarbon make is injected, in the form of a plurality of coherent jets, into said gaseous stream substantially transversely and under sufficient pressure to achieve the degree of penetration required for proper shearing and mixing whereby in a third stage the hydrocarbon make is decomposed and converted into carbon black prior to termination of carbon forming reaction by quenching, the improvement which comprises introducing an auxiliary hydrocarbon in an amount such that the carbon content of the auxiliary hydrocarbon ranges from about 2 to about 60% by weight based

TABLE V

ANALYTICAL PROPERTIES OF CARBON BLACKS

| Carbon Black | Iodine Number | Iodine Surface Area, m²/g | Tinting Strength % SRF | Density lbs/cu.ft. | DBP Absorption cc/100 g on Pellets | Amount of Auxiliary Hydrocarbon % Carbon | Pt. of Aux. Inj. to Make Inj., ft. |
|---|---|---|---|---|---|---|---|
| Example 18 | 90 | 72 | 235 | 20 | 131 | — | — |
| Example 19 | 91 | 75 | 244 | 16 | 162 | 15.5 | 2.75 |
| Example 20 | 91 | 76 | 238 | 15 | 194 | 35.5 | 2.75 |
| Example 21 | 88 | 75 | 229 | 16 | 168 | 47.4 | 2.75 |
| Example 22 | 92 | 75 | 246 | 18 | 150 | 16.7 | 5.5 |
| Example 23 | 88 | 77 | 236 | 16 | 202 | 36.3 | 5.5 |
| Example 24 | 91 | 79 | 234 | 16 | 192 | 34.0 | 5.5 |
| Example 25 | 92 | 77 | 240 | 17 | 166 | 24.5 | 5.5 |
| Example 26 | 90 | 71 | 219 | 18 | 140 | 54.7 | 5.5 |

PHYSICAL PROPERTIES OF NATURAL AND SYNTHETIC RUBBER FORMULATIONS*

| Carbon Black | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| NATURAL RUBBER RECIPE (NR) | | | | | | | | | |
| Tensile, p.s.i. | −70 | +140 | −470 | −375 | +60 | −405 | −560 | −355 | −215 |
| 300% Modulus, p.s.i. | +260 | +590 | +990 | +765 | +510 | +915 | +865 | +720 | +605 |
| SYNTHETIC RUBBER RECIPE (ISR) | | | | | | | | | |
| Tensile, p.s.i. | +100 | +145 | +10 | +30 | +60 | −15 | −100 | −160 | −145 |
| 300% Modulus, p.s.i. | +500 | +965 | +1410 | +1065 | +760 | +1380 | +1155 | +990 | +905 |
| Extrusion Shrinkage, %IRB No. 3 | 92 | 85 | 76 | 78 | 88 | 74 | 75 | 81 | 82 |

*All of the above rubber data is expressed relative to IRB No. 3

From the data in Table V it is readily apparent that, by means of the present invention providing for injection of additional amounts of hydrocarbon upon the total carbon content of the reactants and in a form not yet reacted so as to produce carbon black particles at the zone of substantial reaction in the carbon forming process wherein the hydrocarbon make, previously introduced, mixed, atomized and vaporized, is at the moment undergoing the carbon forming reactions to form the carbon particles which zone is located from about 2 to about 60% of the distance from the point of injection of hydrocarbon make to the point of introduction of the quenching medium and then cooling, separating and recovering the resultant carbon black.

2. A process as defined in claim 1 wherein the auxiliary hydrocarbon is in liquid form and is introduced at a point where the hydrocarbon make is injected.

3. A process as defined in claim 1 wherein the auxiliary hydrocarbon is introduced at a point downstream of the location of injection of the hydrocarbon make such that the distance from the point of injection of hydrocarbon make to the point of introduction of auxiliary hydrocarbon varies from about 2 to about 60% of the distance from the point of injection of hydrocarbon make to the point of introduction of the quenching medium.

4. A process as defined in claim 3 wherein the auxiliary hydrocarbon is in liquid form and is introduced in an amount such that the carbon content of the auxiliary hydrocarbon ranges from about 5 to about 60% by weight based upon the total carbon content of the reactants.

5. A process as defined in claim 4 wherein the auxiliary liquid hydrocarbon is introduced in an amount such that the carbon content of the auxiliary hydrocarbon ranges from about 10 to about 50% by weight based upon the total carbon content of the reactants.

6. A process as defined in claim 3 wherein the auxiliary hydrocarbon is in gaseous form and is introduced in an amount such that the carbon content of the auxiliary hydrocarbon ranges from about 2 to about 10% by weight based upon the total carbon content of the reactants.

7. A process as defined in claim 6 wherein the auxiliary gaseous hydrocarbon is introduced in an amount such that the carbon content of the auxiliary hydrocarbon ranges from about 4 to about 8% by weight based upon the total carbon content of the reactants.

* * * * *